Jan. 2, 1923.  
E. MOESSNER.  
DOUGH CUTTER.  
FILED DEC. 24, 1920.

1,441,106

Ernst Moessner

Patented Jan. 2, 1923.

1,441,106

UNITED STATES PATENT OFFICE.

ERNEST MOESSNER, OF PHILADELPHIA, PENNSYLVANIA.

DOUGH CUTTER.

Application filed December 24, 1920. Serial No. 433,027.

*To all whom it may concern:*

Be it known that I, ERNEST MOESSNER, a citizen of the United States, residing at Philadelphia, in the county of Philadelphia and State of Pennsylvania, have invented certain new and useful Improvements in a Dough Cutter, of which the following is a specification.

This invention relates to culinary utensils and more particularly to an improved type of dough cutter or biscuit cutter for cutting and forming uniform pieces of dough whereby biscuits of a uniform size may be baked.

Another object of the invention is to provide an implement of this character which may be operated by the user to rotate over a strip of dough to cut the sizes of pieces desired.

Another object is to provide a cutter which will be easily constructed and inexpensive to manufacture.

Other objects of the invention will appear upon consideration of the following detail description and accompanying drawings, wherein:—

Figure 1:
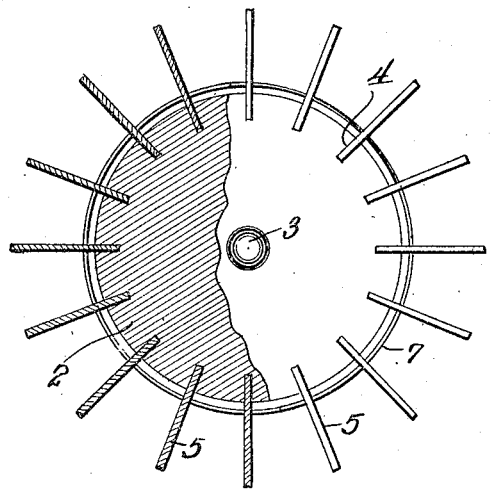
Figure 1 is an end elevation partly in section showing the general construction of one form of the device.
Figure 2:
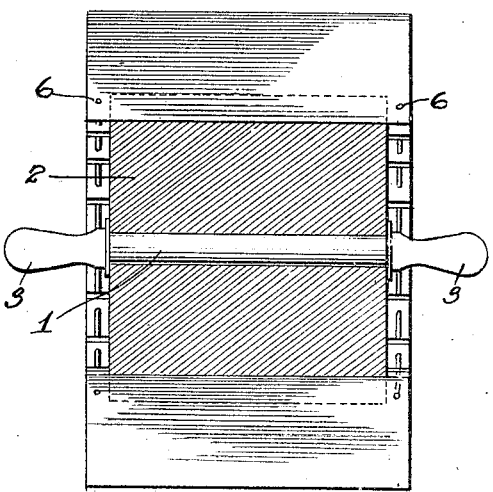
Figure 2 is a longitudinal section therethrough.

Referring to the drawings by numerals, the central axle 1 extends through the cylindrical body 2 and each end of the axle is provided with a handle 3 which may be grasped by the user. The cylindrical body 2 is provided on its outer surfaces with a series of longitudinal slots 4 which are of uniform depth and have open communication with the ends of the cylindrical body 2. It will be noted that these slots are radially disposed as clearly indicated in Fig. 1.

A cutter blade 5 is mounted in each of the slots and the outer edges may be sharpened if necessary. The blades 5 are longer than the length of the cylindrical body 2 so that the end portions of the blades extend beyond the ends of the body portion. Each blade is provided with an opening 6 through which a retaining wire 7 is extended and the ends of the wire are secured together in any preferred manner so that they form retaining rings for maintaining the blades in rigid position within the slots without the use of any other fastening elements.

Figure 3:
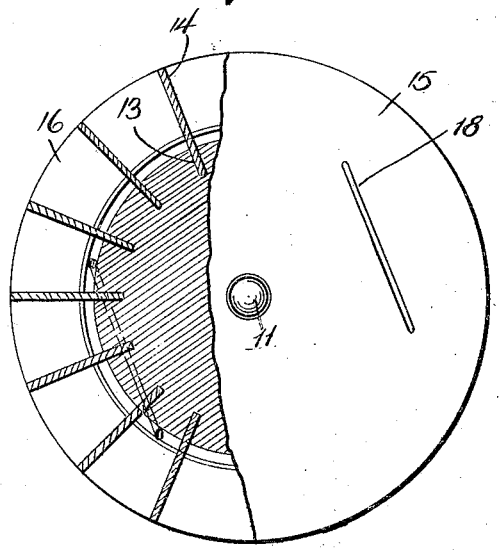
Figure 3 is an end elevation of a slightly modified form of the invention, parts being shown in section.
Figure 4:
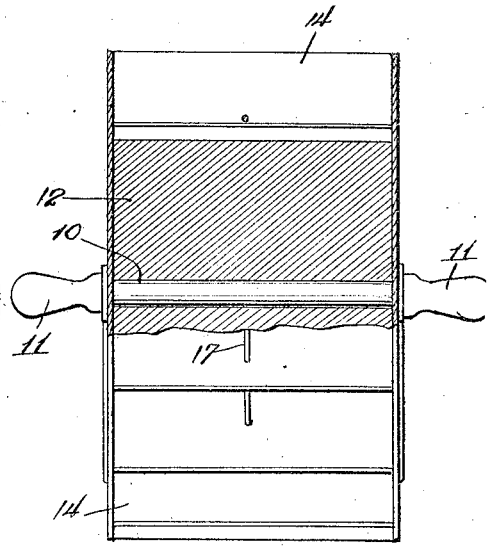
Figure 4 is a transverse section through the same.

As shown to advantage in Figs. 3 and 4 a slightly modified form of the invention includes the central shaft 10 with the end handles 11 thereon, the shaft being extended centrally through the body portion 12 which is also equipped with the radial slots 13. In this instance, however, the blades 14 are of a length equal to the length of the body 12 so that their end edges are flush with the ends of the body 12. Side disks 15 are mounted upon the ends of the shaft 10 and the disks engage the ends of the blades so that pockets 16 are formed by the blades and the side disks 15. The blades 14 are provided at their central portions with small openings through which a retaining wire 17 is extended whereby the blades are held within the slots or grooves 13 and can not be displaced therefrom until the wire 17 is removed. Tangentially disposed retaining members 18 are employed to secure the disks 15 in position, these retaining members consisting of lengths of wire extending through openings at suitable points in the disks and being extended between certain of the pockets 16. In this manner it will be seen that the pockets will form spaces of a size to conveniently receive a portion of the dough when the cutter is rolled over a strip of the same so that biscuits of the desired size will be formed.

Minor changes may be made in the details of construction without departing from the spirit of the invention or the scope of the claim hereunto appended.

What is claimed is:—

A biscuit cutter comprising a cylindrical body portion having a central shaft, means mounted on the ends of the shaft to grip the same whereby the body portion may be rotated over a surface when the said means are manipulated, the body portion being provided with radial slots, cutter elements mounted in the slots, the ends of the said cutter elements being extended, and retaining means mounted in the cutter elements to maintain the cutter blades in position.

In testimony whereof, I have affixed my signature in the presence of two witnesses.

ERNEST MOESSNER.

Witnesses:
 FRED GABLER,
 CHARLES OTTO.